INVENTOR
LEONARD J. ERNST
Donald L. Dennison
&
Allan M. Lowe
ATTORNEYS

INVENTOR
LEONARD J. ERNST
Donald L. Henninson
Allan M. Lowe
ATTORNEYS

INVENTOR
LEONARD J. ERNST
BY Donald L. Dennison & Allan M. Lowe
ATTORNEY

United States Patent Office 3,383,500

Patented May 14, 1968

3,383,500

ANALOG COMPUTER CIRCUITS FOR MULTIPLYING, DIVIDING AND ROOT-TAKING WITH MAGNETIC AMPLIFIER IN A FEEDBACK LOOP

Leonard J. Ernst, Lake Hiawatha, N.J., assignor to General Magnetics, Inc., Bloomfield, N.J., a corporation of New Jersey Filed Mar. 24, 1965, Ser. No. 442,301
17 Claims. (Cl. 235—193.5)

ABSTRACT OF THE DISCLOSURE

Disclosed is an analog computer circuit having a forward loop gain of $A_1$, as well as positive and negative feedback loops of gain $A_2$. In the positive feedback loop, the forward loop signal is multiplied by an offset factor, while in the negative loop the forward loop output signal is multiplied by a signal indicative of a denominator representing signal or by itself to effect root extraction. The circuit may be utilized as a voltage regulator. Multiplication in the feedback loop is effected with a magnetic amplifier having an input winding to which the offset voltage is applied.

The present invention relates generally to analog computer circuits and, more particularly, to an analog computer circuit employing a multiplier in the feedback loop of a low gain amplifier, wherein a constant regenerative feedback factor is provided.

It is commonly known in analog computer techniques to provide a multiplying circuit in the feedback loop of a high gain amplifier. In a divider, such a multiplier has, as one of its inputs, the output of the high gain amplifier, $E_o$, and, as its other input, $E_2$, a signal indicative of the denominator signal. In a square root circuit, both multiplier inputs are derived directly from the amplifier output to provide a signal proportional to the square of the voltage deriving from the amplifier, i.e. $E_2=E_o$. In both instances, the product signal deriving from the multiplier, proportional to the product of its two inputs, is fed back to the input of the amplifier where it is subtracted from an input signal, $E_1$, which for a divider represents the numerator and for a square rooter the quantity to be rooted. By making the amplifier forward, open loop gain sufficiently great, its net input is assumed to be zero so that:

$$E_oE_2-E_1=0 \quad (1)$$

By solving Equation 1 for $E_o$, we obtain $$E_o=\frac{E_1}{E_2} \quad (2)$$

For circuits deriving the square root, $E_2=E_o$, so $$E_o^2=E_1$$

or $$E_o=\sqrt{E} \quad (3)$$

Division and root taking circuit relying upon these circuits, however, have not proved completely satisfactory in that stability problems arise when the loop including the multiplier circuit and the high gain amplifier is closed. In order to obtain optimum results, gain reducing compensating networks must be employed to supply proper phase and gain margins. These, however, reduce amplifier gain and introduce inaccuracies.

To avoid the problem of instability inherent in the high gain amplifier approach, the prior art teaches off setting, in a division circuit, the denominator input to the multiplier by a constant, predetermined amount to introduce regenerative feedback into the system. When the denominator input is off-set by a predetermined amount, the gain of the amplifier in the forward loop can be reduced considerably, to a finite value of $A_1$. The forward loop gain of the amplifier, $A_1$, the transfer function of the multiplier, $A_2$, and its offset input, $E_S$, are adjusted so that $$-A_1A_2E_S=1 \quad (4)$$

It can be shown that the amplifier output voltage is, in a divider of this type, directly proportional to $E_1/E_2$. Such a divider is disclosed, in one embodiment, by the patent to Larse, 2,905,385, issued Sept. 22, 1959.

In the system disclosed by Larse, where a loaded potentiometer is employed to obtain multiplication and offset, only inputs of relatively large magnitude can be employed as the denominator input. This is because of the necessity in utilizing a transducer for driving the slider. Of course, the use of a potentiometer for multiplication is generally to be avoided because of size and weight factors, as well as the inherent susceptability to failure of moving parts. Another disadvantage with the Larse system is that it requires transducing parameters into mechanical motion whereby signals must be converted into a position by means of a motor, for example.

Of course, transducing a signal into mechanical motion results in a device having an inherently low response time, a factor that must frequently be avoided in analog computer division circuits. Other disadvantages attendant with the use of multiplication networks, as disclosed by Larse, are inherent high cost and poor reliability.

The present invention obviates the problems associated with a system such as shown in the Larse patent by employing a magnetic multiplier in the feedback loop of a low gain amplifier network. The magnetic multiplier is preferably of the type having four toroidal like cores which are excited by a variable amplitude AC signal and a variable amplitude DC signal. The permeability level of each core is set by a constant amplitude biasing level. The output signal deriving from the four cores is a true modulation envelope of the AC and DC input signals.

The constant amplitude offset input, $E_S$, to the multiplier is derived by supplying a constant current to an additional winding. The additional winding, frequently referred to as a centering winding, is wound similarly to the denominator signal input winding but produces a flux level in the opposite direction. In consequence, all connections to the centering winding are internal of the multiplier itself and are derived from the same power supply as the one used for the bias winding. By using the centering winding for introducing offset, rather than supplying a constant current to the denominator input signal winding of the multiplier, source impedance variations of the denominator circuit have no effect on the offset signal magnitude. Also, this construction isolates the offset level from the multiplier input signal sources in such a manner as to prevent application of a constant amplitude DC current to the AC signal sources.

For a division circuit, the employment of a magnetic modulator in the feedback loop of an amplifier, with offset applied to one of the multiplier inputs, has resulted in accuracies on the order of one percent for the input signals applied to the circuit. I have also been able to achieve dynamic ranges of denominator inputs in excess of 14 to 1, and numerator ranges in excess of 20 to 1. The accuracy mentioned has been attained throughout these ranges. This is in contrast with other division circuits, particularly magnetic modulator division circuits, employing high gain ampilfiers. Such circuits are reported to have accuracies on the order of 2 percent of full scale, which when reflected into the lowest amplitude denominator signal can result in inaccuracies as high as 15 percent or more.

Because the divider of the present invention is so accurate, I find that it can be employed as an AC voltage control network, having 1 percent regulation for as great as 10 percent input variations. When the divider is employed for voltage regulation, the AC source to be regulated is connected as the numerator input to the divider. The divider denominator input is derived from the AC source being controlled, after full wave rectification. The full wave rectified wave, applied as the denominator input to the divider, varies in amplitude exactly with the amplitude variations of the AC input, so that regulation of the divider output over the prescribed limits is attained.

According to the present invention, the offset principle is utilized for deriving roots, e.g. the square root, of an independent AC input applied to the network. For square root operation, the amplifier output is applied to one input of the multiplier directly and to another multiplier input through a rectifier. In consequence, the signal deriving from the multiplier is an AC signal having the same frequency as the independent input and an amplitude proportional to the square of the amplifier output plus the offset factor. By employing a phase detector as the rectifier in the square root circuit, it is possible to obtain a high degree of accuracy for amplifier output signals down to zero volts. In the circuit actually constructed, errors of only 1.5% over a 256:1 range of inputs from 2.5 millivolts to 640 millivolts were attained, with full scale accuracies to 0.1%. These accuracies are attributed to the offset technique and particular detector type employed.

It is, accordingly, an object of the present invention to provide a new and improved analog computer circuit.

It is another object of the present invention to provide a new and improved analog computer circuit employing a magnetic multiplier in the feedback loop of an amplifying network.

It is still another object of the present invention to provide an analog computer network that is highly sensitive to low amplitude DC signals, has a relatively high speed of response and obviates the instability problems inherent with many of the prior art devices.

Another object of the present invention is to provide a new and improved analog computer circuit employing a multiplier having, as one of its inputs, a signal offset by a predetermined amplitude from zero.

A further object of the present invention is to provide an analog computer circuit having a multiplier with an offset input that is DC isolated from any signal source in the system.

It is still a further object of the present invention to provide an analog computer circuit that is quite small, relatively inexpensive, reliable, has no moving parts, and which is directly responsive to slowly varying, unidirectional current or voltage inputs.

A further object of the present invention is to provide an analog computer division circuit having a magnetic multiplier in the feedback loop of a relatively low gain amplifier wherein the amplifier output and the denominator signal are applied as inputs to the multiplier, and a constant, predetermined amount of offsetting, regenerative feedback is provided.

An additional object of the invention is to provide a new and improved analog computer root taking network having a squaring circuit in the feedback loop of a relatively low gain amplifier, wherein a constant predetermined amount of offsetting, regenerative feedback is provided.

The above and still further objects, features and advantages of the present invention will become apparent upon consideration of the following detailed description of one specific embodiment thereof, especially when taken into conjunction with the accompanying drawings, wherein.

Figures 1, 2:
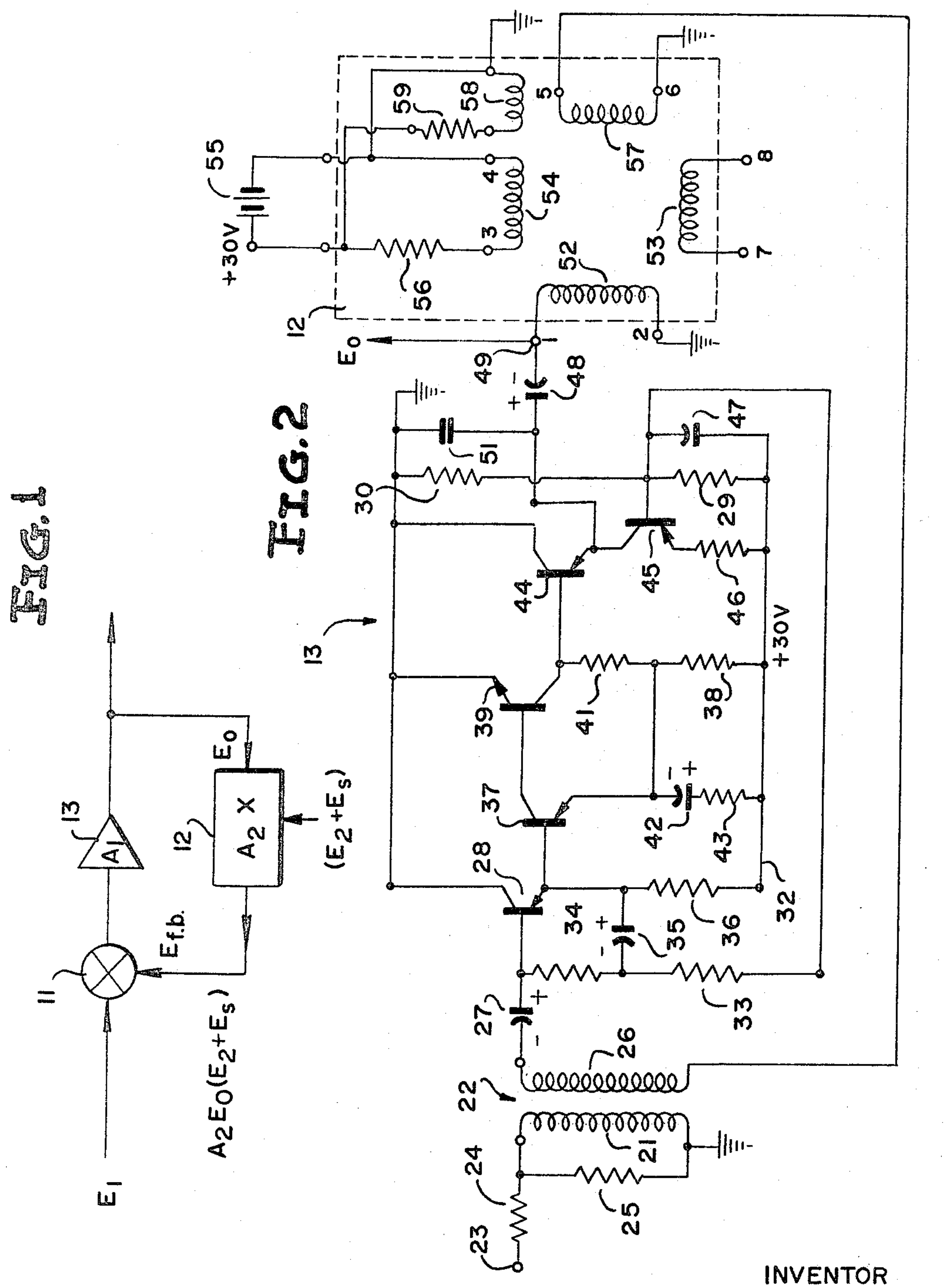
FIGURE 1 is a block diagram wherein the principles of the present invention are disclosed broadly.
FIGURE 2 is a circuit diagram of a preferred embodiment of the circuit of FIGURE 1.

Reference is now made to FIGURE 1 of the drawings wherein an input signal, $E_1$, is applied as the numerator input to a differential node 11. The other input to differentila node 11 is a feedback voltage, $E_{fb}$, deriving from multiplier 12. $E_{fb}$ is subtracted from $E_1$ in node 11 so that negative feedback is provided and the input to relatively low gain amplifier 13, having a gain of $A_1$, is $(E_1-E_{fb})$. Deriving from amplifier 13 is an output voltage, $E_o$, equal in value to $A_1$ $(E_1-E_{fb})$. The output voltage of amplifier 13 is multiplied with another input to multiplier 12, that has a constant response or transfer characteristic of $A_2$. Since the other input to multiplier 12 is expressed as $(E_2+E_s)$, where $E_2$ and $E_s$ are given supra, the output of multiplier 12 is given as $A_2E_o$ $(E_2+E_s)=E_{fb}$. Since $E_o$ is also equal to $(E_1-E_{fb})$ $A_1$, by substitution, $$E_o=\frac{A_1E_1}{1+A_1A_2(E_2+E_s)} \qquad (5)$$

By letting $-A_1A_2E_s=1$, $E_o$ reduces to $$\frac{E_1}{E_2A_2}.$$

Thus, the output voltage of amplifier 13 is exactly proportional to $E_1$ divided by $E_2$, and it is not necessary to approximate $A_1$ as being approximately infinite.

Reference is now made to FIGURE 2 of the drawings wherein a specific embodiment of the invention, as employed as *a*, is illustrated. The $E_1$ numerator input, a variable amplitude AC signal, which in one embodiment may be 800 cycles per second, is applied to the primary winding 21 of transformer 22 from terminal 23 via a resistive voltage divider comprising resistances 24 and 25. The secondary winding 26 of transformer 22 is AC coupled via capacitor 27 to the base of PNP transistor 28. Base biasing for emitter follower transistor stage 28 is provided through the relatively large impedance network comprising the resistive voltage divider including resistors 29 and 30 between the +30 volt supply at lead 32 and ground. The tap between resistors 29 and 30 is connected to the base of transistor 28 by way of resistors 33 and 34, the junction of which is connected to the transistor emitter. Thereby, the input impedance seen by the source at terminal 23 is relatively large due to the positive feedback bootstrapping network comprising capacitor 35.

The AC output signal at the emitter of transistor 28, across resistor 36, equal in amplitude almost to the value of the base to ground voltage of the transistor 28, is applied to the base of PNP transistor 37. Base bias for transistor 37 is provided by the voltage drop through resistor 36 and the emitter circuit of transistor 28 while emitter collector bias is established by the path including resistor 38 and the base emitter junction of NPN transistor 39.

The signal voltage at the collector of transistor 37 is coupled to the base of transistor 39 which develops a negative feedback voltage at the tap between resistors 38 and 41. The negative feedback voltage is fed to the emitter of transistor 37. In the feedback circuit between the collector of transistor 39 and the emitter of transistor 37 is provided a frequency shaping network including the series combinatioin of capacitor 42 and resistor 43, between the emitter of the former transistor and the positive supply at lead 32. The frequency shaping network is employed to prevent low frequency oscillations that might otherwise occur in the amplifier circuit when the feedback loop including the multiplier network is closed.

The signal voltage developed at the collector of NPN transistor 39 is applied to the base of emitter follower output PNP transistor 44. The emitter of transistor 44 is connected to AC ground through the emitter collector path of a constant current source that comprises PNP transistor 45. Biasing of the emitter base junction of transistor 45 is accomplished by connecting the base thereof to the tap between resistors 29 and 30 and by providing a slight amount of self bias with resistor 46 in the transistor emitter circuit. To prevent any spurious AC signal in the network from affecting the emitter collector impedance of transistor 45, the base emitter junction of that transistor is shunted with an AC by-pass capacitor 47 which also serves to prevent the application of signal, other than that deriving from secondary winding 26, to the base of transistor 28.

The amplifier output signal that is in phase with its input, and is derived at the junction between the emitter of transistor 44 and the collector of transistor 45, is supplied via coupling capacitor 48 to input terminal 49 of the magnetic multiplier 12. To prevent any stray high frequency signals from being coupled to magnetic multiplier 12 between terminal 49 and ground, capacitor 51 is provided between the amplifier output terminal and ground. For a 800 cps. numerator input signal, it has been found that a value of 0.03 microfarads serves satisfactorily for capacitor 51.

Magnetic multiplier 12, as preferably employed in the present invention, includes four separate sets of input terminals to which windings are assumed to be connected. These windings are referred to as: excitation winding 52, that is responsive to the 800 cycle output amplifier 13, $E_o$; signal winding 53, responsive to the DC input, denominator signal $E_2$; biasing winding 54, responsive to a constant amplitude DC current deriving from DC power supply 55 and current limiting resistor 56; and output winding 57, that supplies the multiplier output as a differential input to secondary winding 26.

In addition to the external excitation, input signal, bias and output windings, the magnetic multiplier of the present invention includes an additional winding, referred to as centering winding 58. Centering winding 58 is connected internally of the multiplier to the same terminals as biasing winding 54 so that it is responsive to the DC potential of source 55. Registor 59 is adjusted to provide the offsetting factor, $E_s$, so that $A_1A_2E_s=-1$. Since centering winding 58 is wound substantially identically with signal winding 53, its effect on the magnetic circuit of the magnetic multiplier is the same as a constant input voltage applied to winding 53. Thus, the slowly varying, unidirectional $E_2$ denominator input to winding 53 is algebraically combined with $E_s$ offset input to winding 58, whereby the product signal induced in output winding 57 is proportional to $E_o(E_2-E_s)$. Variations of the denominator signal must be sufficiently slow so that any significant harmonics thereof that are added to or subtracted from the frequency of the numerator can be passed by multiplier 12, that has a finite bandwidth centered about the numerator signal frequency.

By adjusting the gain of amplifier 13, comprising transistor stages 28, 37, 39 and 44, the proportionality constant introduced by magnetic multiplier 12 and the offsetting current supplied by winding 58 to the multiplier, to satisfy the expression $$A_1A_2=-\frac{1}{E_s}$$

the circuit of FIGURE 2 divides accurately for denominator inputs to winding 53 that vary between 30 and 300 millivolts. The minus sign is introduced automatically in the system by selecting $E_s$ opposite to $E_2$ and adjusting the multiplier output to be in phase with its input. Since $E_s$ introduces a factor of opposite polarity from $E_2$ into the feedback network, its effect on the overall network operation is the introduction of positive feedback to increase the loop gain and approximate an infinite gain amplifier in the forward loop.

The system response remains extremely constant, despite wide temperature variations because of the extremely stable characteristics of magnetic multiplier 12. In addition, there is sufficient negative feedback regulation included within transistor amplifier 13 to eliminate any detrimental changes in transistor characteristics. Sufficient feedback is provided within the amplifier to maintain its open loop gain equal to $(Z_1/Z_2)/Z_2$;

where $Z_1$ is the impedance of registor 41; and $Z_2$ is the impedance of resistor 38 in parallel with the series combination of resistor 45 and capacitor 42 for the frequency applied to terminal 23.

Figure 3:
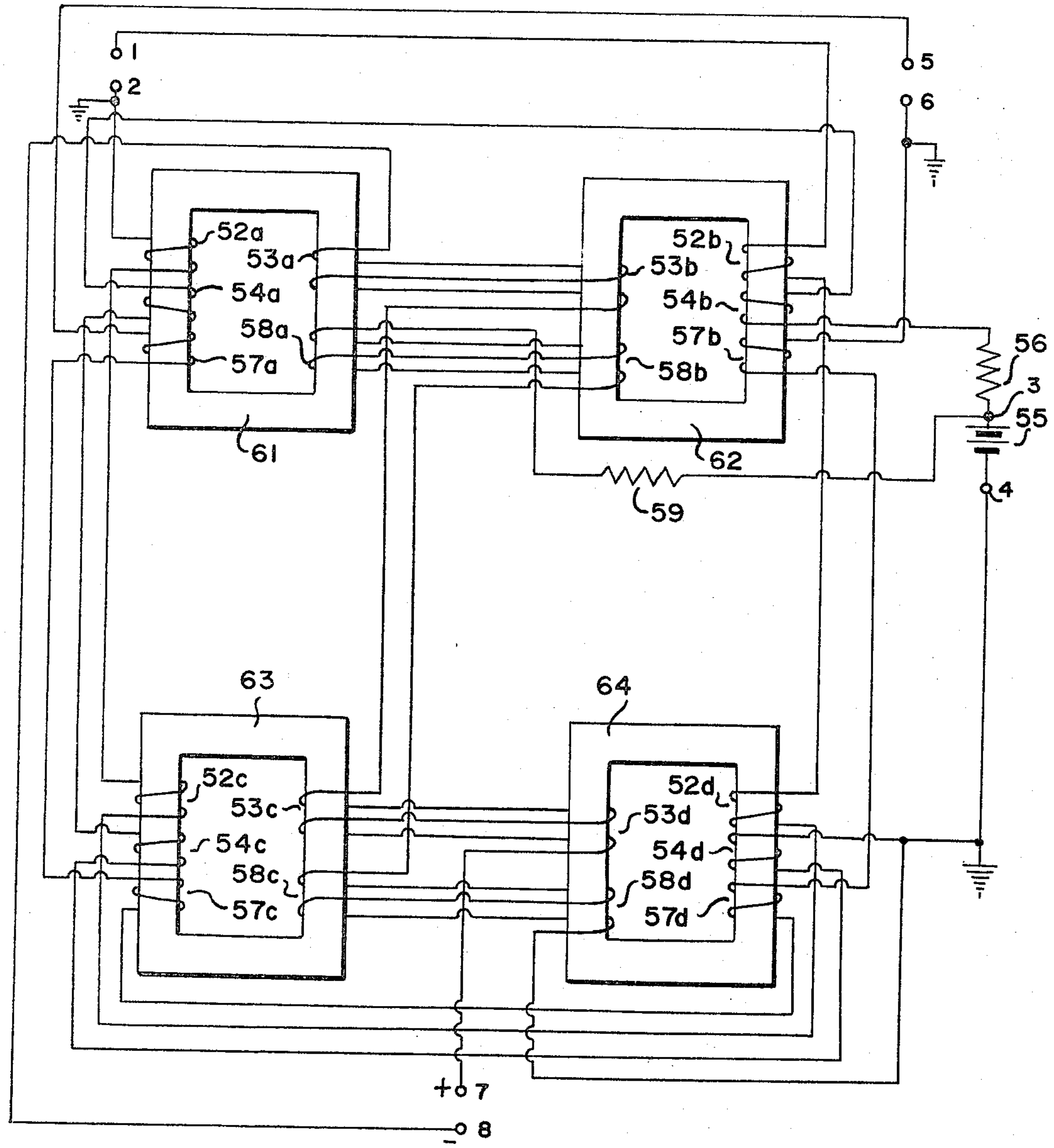
FIGURE 3 is a circuit diagram of a preferred embodiment of the multiplier employed in FIGURE 2.

A preferred embodiment of magnetic multiplier 12 employed in the circuit of FIGURE 2 is shown in FIGURE 3. The modulator comprises four essentially toroidal or laminated high permeability magnetic cores 61–64. Cores 61 and 62 are arranged as one pair of elements that are substantially like a three-legged magnetic core, while cores 63 and 64 are arranged as a separate pair of cores. The adjacent legs of cores 61–64, which are separated from each other by a thin insulating spacer, are provided with two sets of windings, namely signal winding 53 and centering winding 58.

In the ensuing discussion, the windings on each of cores 61–64 are provided with the same nomenclature as exists in the circuit diagram of FIGURE 2, but the winding on each core is denominated by the letters *a*, *b*, *c* and *d* for cores 61–64, respectively.

AC excitation winding 52, reponsive to the AC output signal of amplifier 13, is connected on each of cores 61–64 so that the voltage drops across windings **52*a*–52*d* are all in series aiding relationship: that is, the fluxes induced in cores 61 and 63 in response to the signal in windings 52*a* and 52*c* are in the same direction while the fluxes introduced by windings 52*d* and 52*b* in cores 62 and 64 are in the same direction, but the fluxes in the adjacent legs of cores 61 and 62 are in the opposite direction. Similarly, the AC fluxes introduced in adjacent legs of cores 63 and 64 in response to the AC excitation voltage applied to winding 52 are oppositely directed at any instant. DC bias source 55 is connected with windings 54 in a manner such that windings 54*a* and 54*c* are in series opposition and windings 54*b* and 54*d* are in opposition, while windings 54*c* and 54*d* are in series aiding. Thereby, the magnetic permeability levels set in cores 61 and 62 by the bias effect of source 55 are in the same magnetic direction, which may be assumed to be positive, for example, while the DC flux levels of cores 63 and 64 are set by source 55 to be in the same direction, which is opposite to that of cores 61 and 62. The flux levels of cores 61–64 are set by biasing source 55 to a point where the cores operate to derive the most accurate representation of their two input signals on windings 52 and 53**.

Because division by zero is impossible, the voltage applied to signal winding 53 is only of a single polarity and has a predetermined minimum value. The polarity of the voltage applied to windings 53 is adjusted so that in core 61 it bucks the flux produced by biasing winding **54*a*, while in core 62 it aids the flux introduced by biasing winding 54*b*. In a similar manner, windings 53*c* and 53*d* on cores 63 and 64** are wound so that the fluxes in those cores introduced by the DC signal and bias source, respectively, aid and buck.

On each center leg of cores 61–64 is provided an additional winding, **58*a*, 58*b*, 58*c*, and 58*d*, respectively. These windings are all connected in series with each other and through resistor 59 to the positive and negative terminals of DC source 55. As indicated supra, resistor 59** provides the degree of offset introduced by the term $E_s$. Because $E_2$ and $E_s$ are of opposite polarity, windings *58a*–*58d* are always arranged so that the fluxes introduced by windings *53a*–*53d*, the signal responsive windings. Since the denominator signal and the bias potential are always of a predetermined polarity, this criterion is always effected. In the arrangement shown in FIGURE 3, where the voltage applied to terminal 7 is positive relative to the voltage applied to terminal 8, it is achieved by arranging the directions of windings 53 and 58 to be the same.

Output windings *57a*–*57d* are wound on the same legs of cores 61–64 in the same directions as windings 52 and 54 thereof. The polarities of windings *57a*–*57d* are such that the voltages across windings *57a* and *57d* are in phase with the voltages across coils *52a* and *52d* while the voltages derived across coils *52b* and *52c* are out of phase with the voltages induced in windings *57b* and *57c*. Windings *57a*–*d* are connected in series with each other and to the multiplier output terminals 5 and 6 so that the voltages across windings *57a* and *57b* are in series opposition while the voltages across *57c* and *57d* are in series opposition, that is, in series opposition which the phase of the excitation voltage applied to winding 52.

To describe the operation of magnetic multiplier 13, first consideration will be given to the multiplication effects of cores 61 and 62. The DC fluxes introduced in cores 61 and 62 by windings 54 and *54b*, respectively, set those cores in the positive and negative directions of magnetic permeability. The combined effects of the DC fluxes introduced in core 61 by windings *53a* and *58a* buck the positive flux introduced into that core by winding *54a*, whereby the net positive flux level in the core is reduced. In an opposite manner, the combined DC fluxes in core 62 due to the currents in windings *53b* and *58b* aid the flux level established in that core by winding *54b* and the total negative flux in core 62 is increased.

Because the DC flux level of core 62 is greater than of core 61, inductive coupling between AC windings *52a* and *57a* in core 61 is greater than between windings *52b* and *57b* of core 62. In consequence, there is induced in output winding *57a* a greater AC voltage than in output winding *57b*.

Because of the relative directions of the windings on cores 61 and 62 and the directions in which signals are applied thereto, the AC voltages across coils *57a* and *57b* are in series opposition and subtract from each other. Thereby, the net AC voltage developed across windings *57a* and *57b* is the difference between the flux levels in cores 61 and 62 due to the signals in DC windings *53a*, *53b*, *58a* and *58b*. As the signals applied to windings *53a* and *53b* vary, the flux levels in cores 61 and 62 also vary so that the resultant output from windings *57a* and *57b* is an AC wave having the same frequency as the AC signal applied to terminals 1–2 and an amplitude indicative of the product of the signals applied to terminals 1–2 and 7–8.

The circuits associated with cores 63 and 64 function exactly as those described in conjunction with cores 61 and 62. Cores 63 and 64 are employed because they obviate the necessity for choke coils in the bias of offset windings. The signals induced in output windings *57c* and *57d* are linearly combined with the voltages generated in windings *57a* and *57b* to derive an AC signal across output terminals 5–6. This signal has the same frequency as the frequency of the numerator signal and an amplitude directly proportional to the product of the amplifier 13 output and denominator input.

While the particular magnetic multiplier of FIGURE 3 has been found most satisfactory, it is to be understood that other magnetic multipliers may be employed in lieu thereof. Such other magnetic multipliers need only produce a virtually distortionless AC output having an envelope containing the true modulation products of the signals impressed on terminals 7–8 and 1–2. This output is derived if the relative phases of the AC voltages induced in the excitation windings ond output windings are alike for one pair of cores and opposite for the other pair of cores. In addition, it is required that the DC bias or signal level of one pair of cores be of one polarity and of the other two cores be of the opposite polarity.

Figure 4:
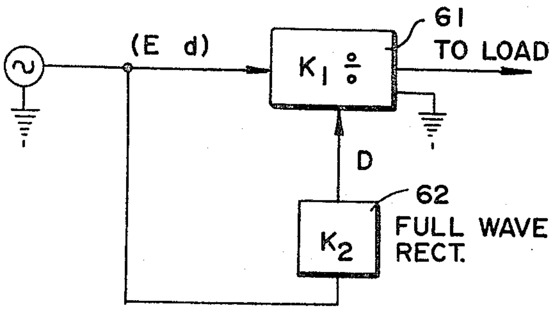
FIGURE 4 is a block diagram illustrating the manner in which the division circuit of the present invention can be employed for effecting voltage regulation of an AC source.

One use of the circuit illustrated in FIGURES 2 and 3, other than as an analog computer division circuit, is in the field of AC voltage regulation. As illustrated in FIGURE 4, an AC voltage regulator employing the concepts of the present invention employs a division circuit 61 having a magnetic multiplier with denominator offset. The AC source to be controlled, having a value $E+\delta$, is applied as the numerator input to the division circuit to terminal 23, FIGURE 2. The input AC voltage is applied through a full wave rectifier 62 to the denominator input of divider terminals 7 and 8, FIGURE 3. If the DC voltage deriving from full wave rectifier is represented as $K_2(E+\delta)$ and the amplification factor of division network 61 is $K_1$, the AC output deriving from division circuit 61 across terminals 5 and 6 of the magnetic multiplier of FIGURE 3, is $$\frac{K_1(E+\delta)}{K_2(E+\delta)}$$

Because $\delta$ can vary widely, even over a 10 to 1 range, the voltage output of divider 61 remains substantially constant since the $E+\delta$ terms in the numerator and denominator cancel out. Thus, AC voltage regulation is attained strictly as a function of the transfer functions of full-wave rectifier 62 and division circuit 61, so the output of the AC voltage remains substantially constant despite extremely wide fluctuations of the input.

Figure 5:
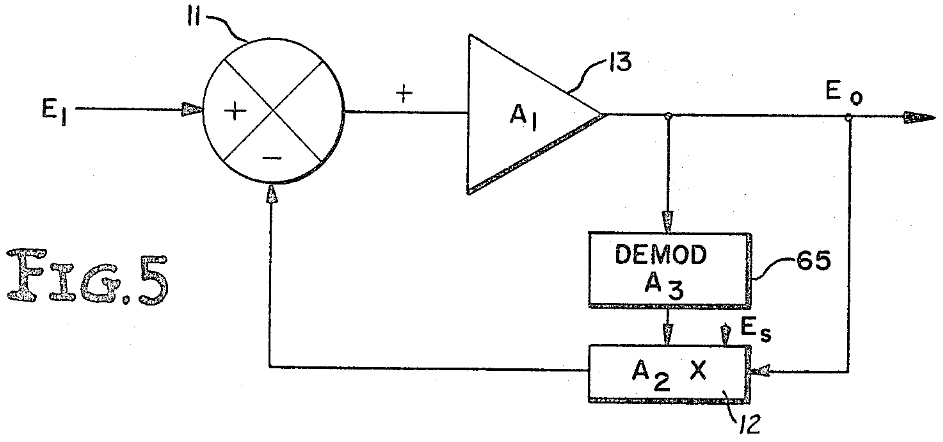
FIGURE 5 is a block diagram of a square root taking embodiment of the invention.

Reference is now made to FIGURE 5 of the drawings wherein there is illustrated a square rooting network, according to the present invention. This network differs from the circuit of FIGURES 1–3 since the feedback loop includes a demodulator 65 that feeds the low frequency signal input terminal of multiplier 12. Therefore, the $E_2$ input of multiplier 12 is represented by $A_3E_o$, where $A_3$ is the transfer function of demodulator 65.

Substituting into Equation 5, the expression for the AC output of amplifier 11 becomes:

$$E_o=\frac{A_1E_1}{1+A_1A_2(A_3E_o+E_s)} \quad (6)$$

By letting $$A_1A_2E_s=-1 \quad (7)$$

Equation 6 simplifies to $$E_o=\frac{A_1E_1}{A_1A_2A_3E_o} \quad (8)$$

Solving Equation 8 for $E_0$ yields $$E_o=\sqrt{\frac{E_1}{A_2A_3}} \quad (9)$$

The amplifier and multiplier employed in FIGURE 5 can be exactly as shown in FIGURES 2 and 3. The multiplier offset current is adjusted to satisfy Equation 7.

Figure 6:
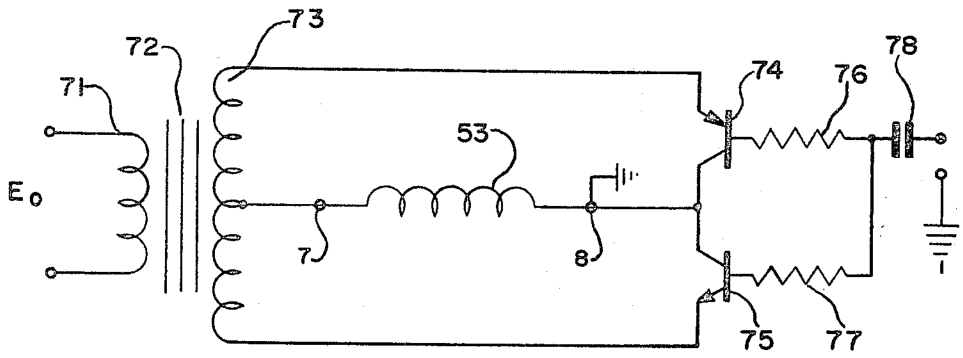
FIGURE 6 is a circuit diagram of the phase detector employed in the network of FIGURE 5.

The demodulator employed in the square root network is preferably a phase demodulator of the type shown by FIGURE 6 so that accurate DC multiplier inputs are derived for amplifier outputs down to zero volts. In FIGURE 6, the amplifier output voltage is applied to primary winding 71 of transformer 72. Opposite ends of the transformer secondary winding 73 are connected to the emitters of complementary transistors 74 and 75 while the transformer secondary tap is connected to terminal 7, at one end of the multiplier DC signal winding 53. Terminal 8, at the other end of winding 53, is grounded with the common connection of the collectors of transistors 74 and 75. The bases of PNP and NPN transistors 74 and 75, respectively, are driven in parallel through resistors 76 and 77 and coupling capacitor 78 by a reference AC wave of constant amplitude and the same frequency as the $E_1$ input wave to the network. The voltages applied to the bases of transistors 74 and 75 are of sufficiently large amplitude to drive one transistor into saturation while the other is cut off during one half cycle and vice versa for the other half cycle. Because transistors 74 and 75 are driven essentially as out of phase switches by the reference wave, there is derived across winding 53 a full wave rectified voltage at twice the frequency of $E_1$, i.e., the multiplier center frequency. Since the multiplier does not, in most instances, have sufficiently wide bandwidth to be responsive to the second harmoinc of the $E_1$, there is usually no need to employ ripple removing filters prior to supplying the demodulator output to the multiplier input.

Figure 7:
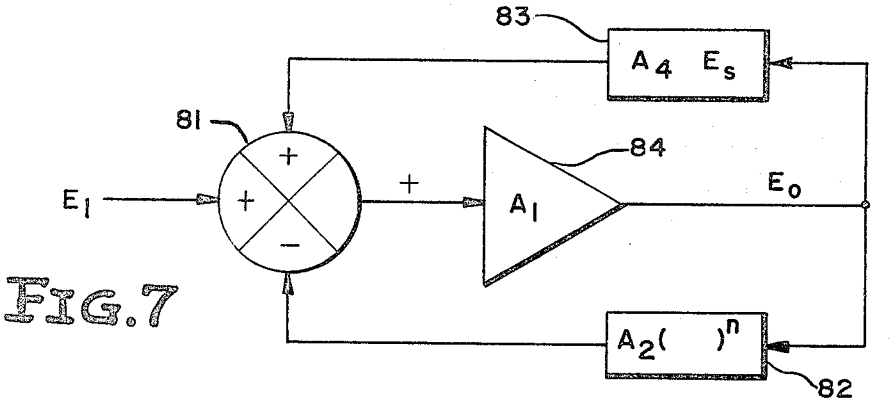
FIGURE 7 is a circuit diagram illustrating the manner in which the principles of the invention can be extended to the *n*th root.

The square root technique disclosed by FIGURE 5 can be extended to cover the derivation of the *n*th root, as illustrated in the circuit of FIGURE 7. The independent input signal, $E_1$, is applied to node 81, where it is linearly combined with the outputs of feedback networks 82 and 83. The resultant output derived from network 81 is applied to amplifier 84, having a finite gain $A_1$. The signal deriving from amplifier 84 is applied in parallel to networks 83 and 84, the former multiplying it by the constant factor $A_4E_s$ to supply a signal to node 81 that is in phase with $E_1$. Thus, positive feedback of a signal having amplitude $E_oA_4E_s$ is established through network 83.

Network 82 modifies $E_o$ to derive a signal in accordane with $A_2(E_o)^n$, where $A_2$ is a constant factor. Network 82 may take any conventional form, and if an AC input is employed, it preferably comprises $(n-1)$ cascaded magnetic multipliers. In such an instance, the AC output of each multiplier drives the next multiplier in the string and the AC output of amplifier 84 is rectified by the detector shown in FIGURE 6 to drive the signal winding of each multiplier. The output signal deriving from network 82 is applied to node 81 in phase opposition to $E_1$ to form a negative feedback path.

By writing the equations for the circuit shown in FIGURE 7, we see that:

$$\frac{E_o}{A_1}=E_1+A_4E_sE_o-A_2E_o^n$$

which simplifies to:

$$E_o(1-A_1A_4E_s)=A_1E_1-A_2E_o^n \qquad (10)$$

By letting $A_1A_4E_s=1$, Equation 10 simplifies to:

$$E_o^n=\frac{A_1E_1}{A_2} \qquad (11)$$

which gives:

$$E_o^n=\sqrt{\frac{A_1E_1}{E_2}} \qquad (12)$$

Thus, the circuits of the present invention provide accurate results, not based on approximations, which results are dependent almost primarily on the accuracy of the device in the feedback path. When the feedback device is a magnetic multiplier, I have found that the attainable accuracies are outstanding as indicated supra.

While I have described and illustrated one specific embodiment of my invention, it will be clear that variation of the details of construction which are specifically illustrated and described may be resorted to without departing from the true spirit and scope of the invention as defined in the appended claims.

I claim:

1. An analog computer network responsive to an independent AC signal source and a DC signal comprising a forward loop having a constant predetermined transfer function, $A_1$, for deriving an AC output, a feedback loop having a constant predetermined transfer function, $A_2$, responsive to said AC output for deriving an AC feedback signal, said forward loop being responsive to said AC input and feedback signals, said feedback loop including negative and positive feedback portions, said negative feedback portion including means for multiplying said AC output with said DC signal, said positive feedback portion including means for multiplying said AC output with an offset amplitude, $E_s$, the transfer functions and offset amplitude being arranged so that $A_1A_2E_s=-1$, said feedback loop including a magnetic amplifier having: an AC input winding responsive to said AC output, a DC input winding responsive to said DC signal, and an output winding for deriving an AC signal indicative of the product of the signals applied to said windings; and means for coupling the signal derived across said output winding to said forward loop.

2. The circuit of claim 1 wherein said positive feedback portion comprises a further winding of said magnetic amplifier responsive to a DC voltage indicative of said offset amplitude, said further and DC windings providing DC fluxes of opposite polarity in said amplifier.

3. The circuit of claim 1 wherein said magnetic multiplier includes at least two transformers, the AC input and output windings being wound on each of said transformers so that the phases of one of said windings are alike and the phases across the other of said windings are different, said DC input winding being formed as separate windings on said first and second transformers such that said windings forming said DC input winding are out of phase, and wherein said means for providing positive feedback comprises an additional winding on each of said transformers, said additional windings being connected in series with each other to a source of DC current of predetermined value and being responsive to said offset amplitude, said additional windings being arranged relative to said windings forming said DC input winding so that the DC fluxes induced in said first and second transformers are of opposite directions for said unidirectional signal and offset level.

4. The division circuit of claim 1 wherein said forward loop includes amplifier means having a negative feedback loop including a pair of cascaded opposite conductivity type transistors, the collector of the first of said transistors being DC coupled to the base of said second transistor and the collector of said second transistor being coupled to the emitter of said first transistor.

5. The division circuit of claim 4 wherein said amplifier further includes a DC voltage divider in the collector circuit of second transistor, said voltage divider having a tap connected to an impedance shunting a portion of said voltage divider.

6. The division circuit of claim 5 wherein said impedance includes a series capacitance and resistance.

7. A voltage controller for an AC source comprising a division circuit including means for dividing an AC numerator input by a DC denominator input, means for applying the AC source to said AC input, means for rectifying said AC source to derive a rectified AC, means for applying the rectified AC to said DC input of said division circuit, said division circuit comprising an AC amplifier having a predetermined open loop gain, $A_1$, a magnetic multiplier having: an AC input winding responsive to the output of said amplifier, another winding responsive to the rectified AC, and an output winding for deriving an AC signal indicative of the product of the AC input and rectified AC applied to said input windings; means for coupling the signal derived across said output winding in a negative feedback path with said AC input signal to the input of said AC amplifier, and means for subtracting the effect of the rectified AC coupled to said DC input by a predetermined DC offset level, $E_s$, said multiplier having a constant transfer function, $A_2$, $A_1A_2E_s$ being arranged to equal $-1$.

8. The computer of claim 1 wherein said DC signal is derived from an independent source, whereby the amplitude of said AC output is proportional to the amplitude of the independent AC signal divided by the amplitude of the DC signal.

9. The circuit of claim 8 wherein said positive feedback means comprises a further winding for said magnetic amplifier responsive to a DC voltage indicative of said offset amplitude, said further and DC windings providing DC fluxes of opposite polarity for said amplifier.

10. The computer of claim 1 including means for rectifying the AC output, and means for applying the rectified AC output to the DC winding of said magnetic amplifier, whereby the amplitude of the AC output is indicative of a root of the amplitude of the AC input signal.

11. The circuit of claim 10 wherein said positive feedback means comprises a further winding for said magnetic amplifier responsive to a DC voltage indicative of said offset amplitude, said further and DC windings providing DC fluxes of opposite polarity for said amplifier.

12. The circuit of claim 10 wherein said rectifying means comprises a full wave rectifying phase detector having a reference wave of frequency *f*, the same frequency as the frequency of the AC input signal, applied thereto.

13. The circuit of claim 12 wherein said detector derives an unfiltered wave of fundamental frequency 2*f* and includes means for coupling a replica of said unfiltered wave to the DC input winding.

14. The circuit of claim 13 wherein said phase detector includes a pair of opposite conductivity transistors driven in parallel by said reference wave.

15. An analog computer network for deriving an output indicative of the *n*th root of the amplitude of an independent signal source comprising a forward loop having a constant transfer function, $A_1$, for deriving an output signal, $E_o$, a feedback loop having a constant transfer function, $A_2$, responsive to said output signal for deriving a feedback signal, said forward loop being responsive to said independent and feedback signals, said feedback loop including negative and positive feedback portions, said negative feedback portion including means for deriving a signal proportional to $E_o^n$, said positive feedback portion including means for multiplying said output signal with an offset amplitude $E_s$, the transfer functions and offset amplitude being arranged so that $A_1A_2E_s$ equals −1.

16. The controller of claim 7 wherein said magnetic amplifier includes a further winding responsive to a DC voltage indicative of said offset level, said further and another windings providing DC fluxes of opposite polarity for said magnetic amplifier.

17. An analog computer square root taking circuit responsive to an independent input signal comprising an amplifier having a predetermined open loop gain, $A_1$, a two input multiplier having one input responsive to the output of said amlifier, and a constant amplitude transfer function, $A_2$, means for linearly combining the output of said amplifier with a constant amplitude factor, $E_s$, to derive a combined signal $A_3E_o+E_s$, where $A_3$ is another constant factor, means for applying said combined signal to the other input of said multiplier, whereby said multiplier derives an output signal indicative of $A_2E_o(E_s+A_3E_o)$, means for applying said multiplier output signal to the input of said amplifier so that negative feedback between said multiplier output signal and said input signal is effected, where $A_1A_2E_s$ is adjusted to equal −1.

References Cited

UNITED STATES PATENTS

| | | | |
|---|---|---|---|
| 3,016,197 | 1/1962 | Newbold | 235—193.5 X |
| 3,057,555 | 10/1962 | Case | 235—196 X |
| 3,202,809 | 8/1965 | King et al. | 235—196 |

MALCOLM A. MORRISON, *Primary Examiner.*

J. F. RUGGIERO, *Assistant Examiner.*